Sept. 26, 1939.    J. W. LEIGHTON    2,173,974
INDIVIDUAL SPRINGING
Filed July 6, 1937    2 Sheets-Sheet 1
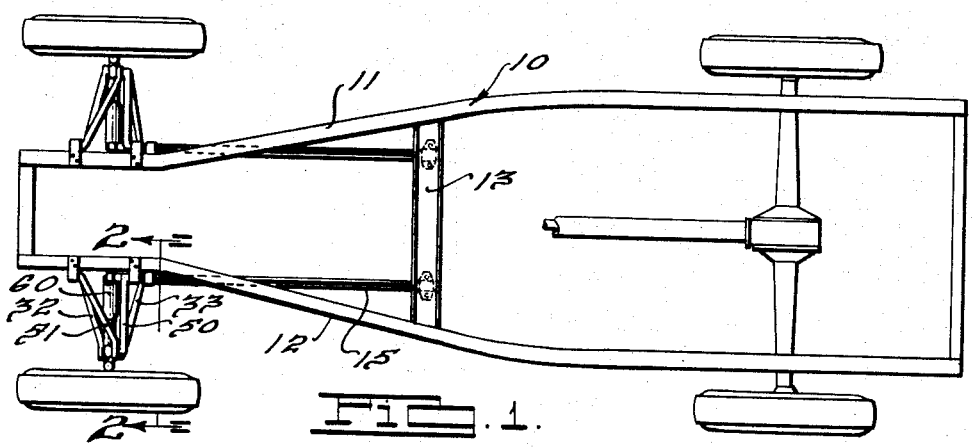
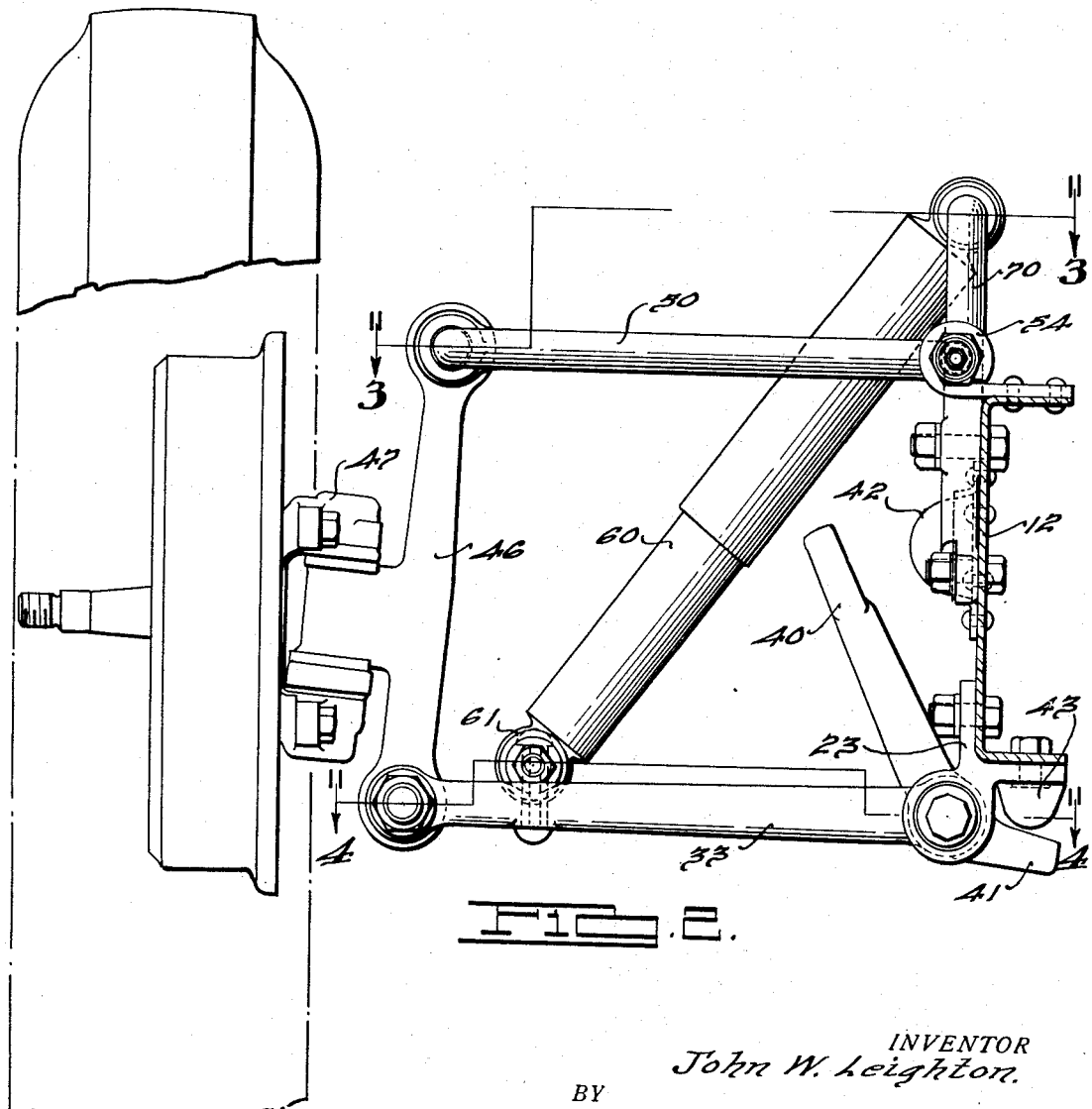
INVENTOR
John W. Leighton.
BY
Harness, Dickey & Pierce.
ATTORNEYS.

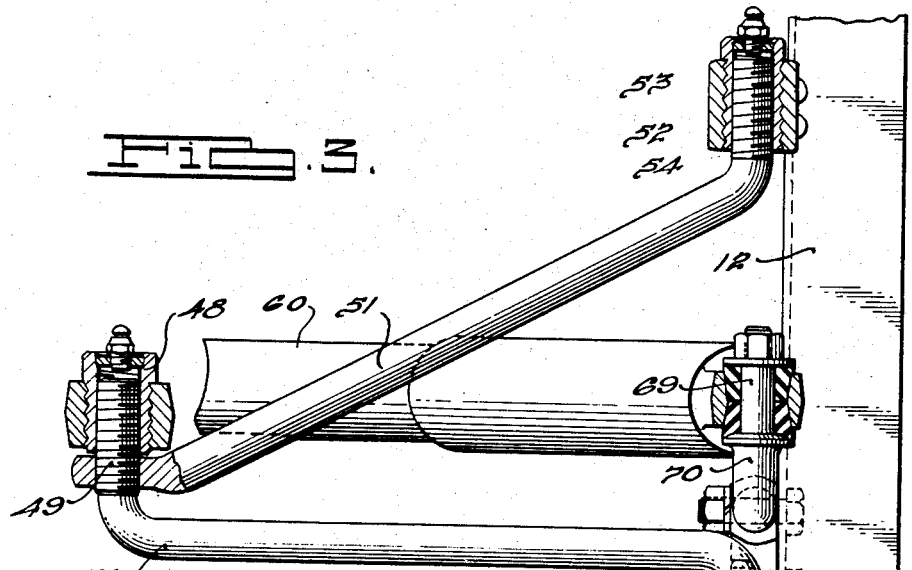
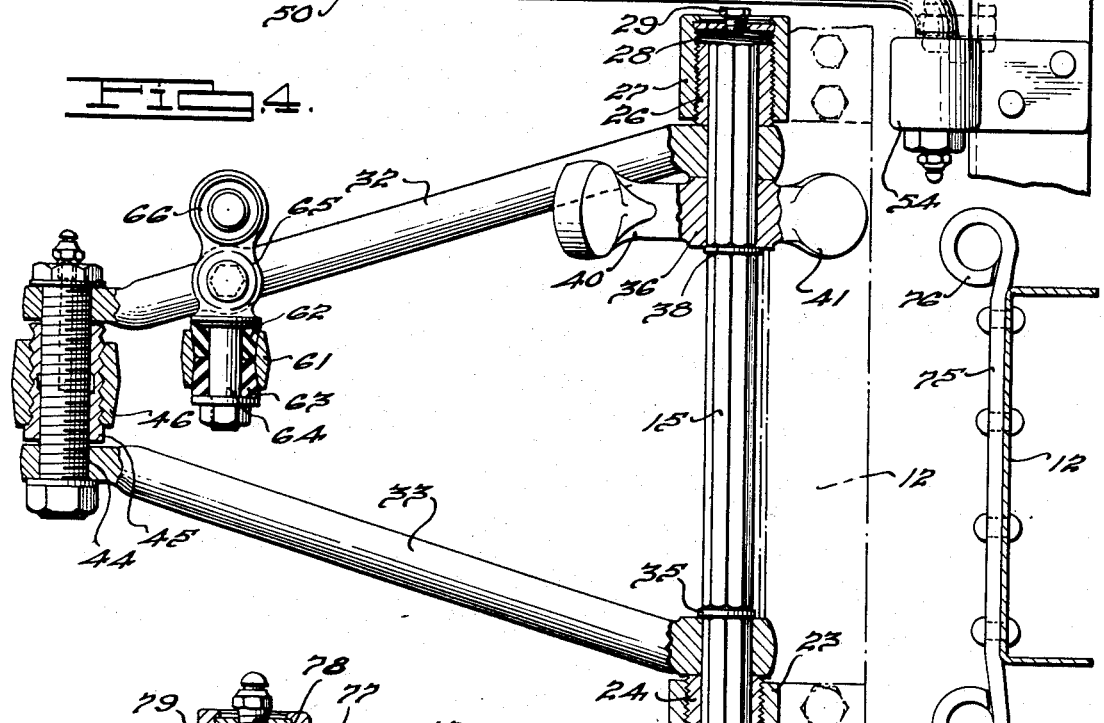

Patented Sept. 26, 1939

2,173,974

UNITED STATES PATENT OFFICE 2,173,974

INDIVIDUAL SPRINGING

John W. Leighton, Port Huron, Mich.

Application July 6, 1937, Serial No. 152,120

8 Claims. (Cl. 267—57)

The invention relates to motor vehicles and it has particular relation to individual springing for the wheels.

One object of the invention is to provide an improved individually sprung wheel mounting which may be manufactured and assembled efficiently and inexpensively while still meeting the requirements necessary for satisfactory operation.

Another object of the invention is to provide individual springing, including pivotal links connecting the wheel to the frame wherein a torsion bar serves the dual function of a spring and also as an operative part of the link connecting means.

Another object of the invention is to provide an improved mounting wherein the torsion bar mentioned above serves as a pivot bolt for linkage connecting the frame to the wheel.

Another object of the invention is to provide improved means for limiting relative movement of the wheels and frame in both directions.

Other objects of the invention will become apparent from the following specification, the drawings relating thereto, and from the claims hereinafter set forth.

For a better understanding of the invention, reference may be had to the drawings wherein:

Figure 1 is a plan view of a chassis of an automobile, illustrating individual springing as constructed according to one form of the invention;

Fig. 2 is a cross-sectional view on a large scale taken substantially along the line 2—2 of Fig. 1;

Fig. 3 is a cross-sectional view taken substantially along the line 3—3 of Fig. 2;

Fig. 4 is a cross-sectional view taken substantially along the line 4—4 of Fig. 2;

Fig. 5 is a detailed view in cross-section illustrating an alternative way of rotatably mounting the end of the torsion bar; and Fig. 6 is a cross-sectional view illustrating a mounting bracket adapted to rotatably support parts of both the upper and lower linkage between the wheel and frame.

Referring to Figure 1, the frame of the automobile is indicated generally at 10 and includes the side members 11 and 12 converging toward the front and terminating in parallel portions, and an intermediate cross frame member 13. The frame, of course, is illustrated more or less diagrammatically and the parts mentioned serve to illustrate application of the invention. It may be indicated generally that the individual springing includes torsion bars that are anchored against rotation at a point substantially remote from the front and which are turned torsionally during relative vertical movement of the wheels and the frame. The individual springing is the same at both sides of the frame for both of the front wheels and accordingly, a description concerning one side is sufficient.

Now referring to Figures 1 and 4 together, the torsion bar is indicated at 15 and extends rearwardly to the cross frame member 13 where it is anchored in a bracket 16 bolted to the cross member. The torsion bar is hexagonal in shape and for anchoring it against rotation at its rearward end, the bracket 16 has a correspondingly shaped opening 17. Lubricant may be injected into the bracket through a grease fitting 18 projecting through a Welch plug 19 secured in the end of the bracket and for facilitating movement of the lubricant along the end of the torsion bar, a spirally arranged groove 20 is formed in the inner periphery of the bracket. It will be noted that the end of the torsion bar is spaced from the Welch plug 19 and during operation of the wheel mounting some axial movement of the torsion bar may be required and the spacing mentioned will permit this.

Along the front of the frame the torsion bar projects through a bracket 23 bolted to the frame and the opening in the bracket is threaded and receives an externally threaded bushing 24. The bushing in turn has a hexagonal opening receiving the torsion bar with a working fit and it will be understood that during any torsional turning of the front end of the bar, the bushing will turn with the bar and have a pivotal threaded bearing engagement with the bracket 23.

At its extreme front end, the torsion bar similarly projects through and fits a second bushing 26 that similarly has a pivotal threaded engagement with the bracket 27 also bolted to the frame. The front end of this bracket is closed by means of a Welch plug 28 having a grease fitting 29, so that lubricant may be injected into the space between the plug and the end of the torsion bar. Inasmuch as some axial movement of the torsion bar may be required, the end thereof is spaced from the Welch plug 28, as illustrated. A grease fitting may also be provided on the bracket 23 and this may pass through the side wall of the bracket so that lubricant may be forced into the threaded area.

From this description it will be apparent that the torsion bar is slidably but non-rotatably mounted in the bracket 16 on the cross member 13, while it is rotatably mounted in the brackets 23 and 27 by means of a pivotal, threaded bearing.

Between the bushings 26 and 24, links 32 and 33 are provided for wheel mounting purposes, and the ends of the links adjacent the frame have hexagonal openings closely fitting hexagonal portions of the torsion bar adjacent the bushings respectively. The link 33 is positioned axially by the bushing 24 and an upset collar 35 on the torsion bar formed by upsetting the metal, while the link 32 is positioned axially by the bushing 26 and a bell crank member 36 also having a hexagonal opening receiving the torsion bar. This member in turn engages a second upset portion of the torsion bar, indicated at 38. It should be apparent from this description that any vertical, pivotal movement of the links 32 and 33 relative to the frame will turn the torsion bar and owing to the threaded bearing engagement, a little axial movement of the links and torsion bar may occur, but the links and threaded bushings will maintain their relative positions so that loose axial movement of the links on the torsion bar will not be permitted.

It may be mentioned in connection with the member 36 that it has bell crank portions 40 and 41, which, as best shown in Figure 2, are adapted to engage, respectively, rubber bumpers 42 and 43 on the frame, so as to resiliently limit movement of the links 32 and 33 in a vertical direction. Thus, torsional turning of the torsion bar is positively limited.

As shown by Figure 4 particularly, the links 32 and 33 converge outwardly and terminate in apertured threaded portions which receive a threaded pivot bolt 44. This bolt pivotally but threadedly receives a bushing 45 between the ends of the arms and the bushing has an external locking thread that is tightly threaded into the lower end of a wheel mounting member 46. As shown by Figure 2, the wheel mounting member 46 provides a support for a wheel mounting knuckle bracket 47 in a generally conventional manner, as will be readily understood.

Now referring to Figures 2 and 3 jointly, the upper end of the wheel mounting member 46 is apertured and a bushing 48 is threaded thereinto in a locking manner similarly to the bushing 45 and the bushing 48 is internally threaded and has pivotal threaded engagement with the offset threaded end 49 of an upper link member 50. An auxiliary link 51, having an outer apertured and threaded end, has a threaded engagement with the offset threaded end 49 and extends inwardly in diverging relation to the link 50. The links 50 and 51 terminate at their inner ends in oppositely directed threaded ends 52, that have pivotal threaded engagement with bushings 53 similar to the bushing 48, and these bushings in turn are threaded into brackets 54 on the frame by means of locking threads.

As shown by Figure 2, a shock absorber 60 of conventional construction may be used, and as best shown by Figure 4, the lower end of the shock absorber has an eye portion 61 embracing rubber bushing elements 62 and 63 mounted on a pin 64 that forms part of a bracket 65, which is riveted to the link 32. This bracket has an offset portion 66 for engaging a lifting jack. The upper end of the shock absorber, as shown by Figure 3, similarly engages a pin portion 69 of a bracket member 70 bolted to the frame, and this member corresponds to the construction disclosed in the applicant's copending application, Serial No. 89,081, filed July 6, 1936.

As an alternative way of supporting the extreme front end of the torsion bar 15, and also supporting the inner end of the upper link 51, a single sheet metal member 75 may be employed which is bolted to the frame, as shown by Figure 6. The upper end of this member is bent into circular form, as indicated at 76, and it will be appreciated that the threaded inner end of the link 51 may project through this opening and that the bushing 53 may be threaded into the portion 76. The lower end of the member 75 similarly has a portion 77 and for mounting the extreme front end of the torsion bar therein an arrangement may be used such as shown by Figure 5. In this case the front end of the torsion bar is threaded, as indicated at 78, and a bushing 79 is threaded into the portion 77 and on the threaded end of the bar. It will be understood that the bushings have a lock fit with the portions 76 and 77 of the bracket 75 and that the torsion bar and link 51 have a threaded pivotal engagement with the bushing. It may be mentioned also that it is not necessary that threads be formed in the portions 76 and 77 as the bushings may be threaded thereinto owing to the fact that the portions 76 and 77 will expand sufficiently to permit this, although when the bushings are threaded thereinto, threads will be cut therein to positively hold the bushings in place.

The construction simplifies individual springing considerably. Dual use is made of a torsion bar in that it also serves as a pivot bolt for the lower links. Most of the parts of the structure may be made from bar stock of standard size and this renders it much less expensive to manufacture. Adjustment of the torsion bar may be effected readily by placing the bracket 16 on the bar at different circumferential positions, or, in other words, by removing the bracket, then turning the bar, and then again applying the bracket. This in effect, changes the effective length of the bar.

Although more than one form of the invention has been illustrated and described in detail, it will be apparent to those skilled in the art that various modifications may be made without departing from the scope of the appended claims.

In some respects, certain structure shown and described herein, and particularly that shown by Fig. 3, may be similar to structure disclosed and claimed in my copending application for patent, Serial No. 106,340, filed October 19, 1936, entitled "Suspension arm".

What is claimed is:

1. An individual suspension comprising a vehicle frame, an elongated torsion bar, means anchoring one end of the bar on the frame, threaded bearing means turnably supporting the opposite end of the bar on the frame, and wheel supporting means connected to said opposite end of the bar.

2. In combination, a vehicle, and a pivotal joint on the vehicle comprising a polygonal bar, an externally threaded bushing having a polygonal opening receiving the polygonal portion of the bar, and a threaded member having pivotal threaded bearing engagement with the threads on the bushing.

3. In combination, a vehicle frame, a torsion bar extending along the frame, threaded bearing means on the frame turnably supporting a part of the bar, wheel supporting means connected to the bar adjacent the threaded bearing means and adapted to torsionally turn the bar during relative vertical movement of the frame and wheel, and means for non-turnably anchoring the bar at a point substantially spaced from the connection between the wheel supporting means and the bar while allowing the bar to move axially.

4. In combination, a vehicle frame, a torsion bar extending along the frame, a threaded opening in the frame through which the bar projects, a bushing non-rotatably mounted on the bar and pivotally threaded in the opening, wheel supporting means connected to the bar and adapted to turn it during relative vertical movement of the wheel and frame, and means for anchoring the bar against turning while permitting axial movement thereof at a point remote from the connection between the wheel supporting means and the bar.

5. In combination, a vehicle frame, a torsion bar non-circular in cross section extending along the frame, longitudinally spaced bearing supports on the frame rotatably receiving longitudinally spaced portions of the bar, a pair of wheel supporting links extending laterally from the bar and having non-circular apertures in their inner ends complementary to the bar and receiving the latter so that when the links are turned, the bar turns, means connecting the outer ends of the links, shoulders on the bar and cooperating with the inner ends of the links for substantially preventing longitudinal movement of the links relative to the bar, and means for anchoring the bar at one point to the frame.

6. In combination, a vehicle frame, a polygonal torsion bar extending along the frame, externally threaded bushings at spaced points on the bar and having polygonal openings complementarily receiving the bar, bearing brackets on the frame and having threaded openings threadably and rotatably receiving bushings so as to provide threaded bearings for the bar when the latter turns, a pair of wheel supporting laterally extending links having polygonal openings at their inner ends receiving the bar so that turning of the links causes turning of the bar, means connecting the links at their outer ends, means including integral shoulders on the bar for axially positioning the links on the bar, and means on the frame for anchoring the bar at one point.

7. In combination, a vehicle frame, an elongated torsion bar, means anchoring the bar at one point against turning, wheel supporting means connected to the bar at a point substantially spaced from the anchoring point so that vertical movement of the wheel relative to the frame causes torsional turning of the bar with respect to the anchored part of the bar, and means on and turnable wtih the bar at a point substantially spaced from the anchored part of the bar and adapted to engage the frame for limiting the torsional turning.

8. In combination, a vehicle frame, an elongated torsion bar, means anchoring the bar at one point against turning, wheel supporting means connected to the bar at a point substantially spaced from the anchoring point so that vertical movement of the wheel relative to the frame causes torsional turning of the bar with respect to the anchored part of the bar, a bell crank on and turnable with the bar at a point substantially spaced from the anchored part of the bar, and a pair of buffing means on the frame adapted to be respectively engaged by the arms so as to limit torsional turning of the bar in both directions.

JOHN W. LEIGHTON.